Sept. 8, 1925.
A. M. SANDS ET AL
1,552,762
LIQUID MEASURING DEVICE
Filed March 16, 1921
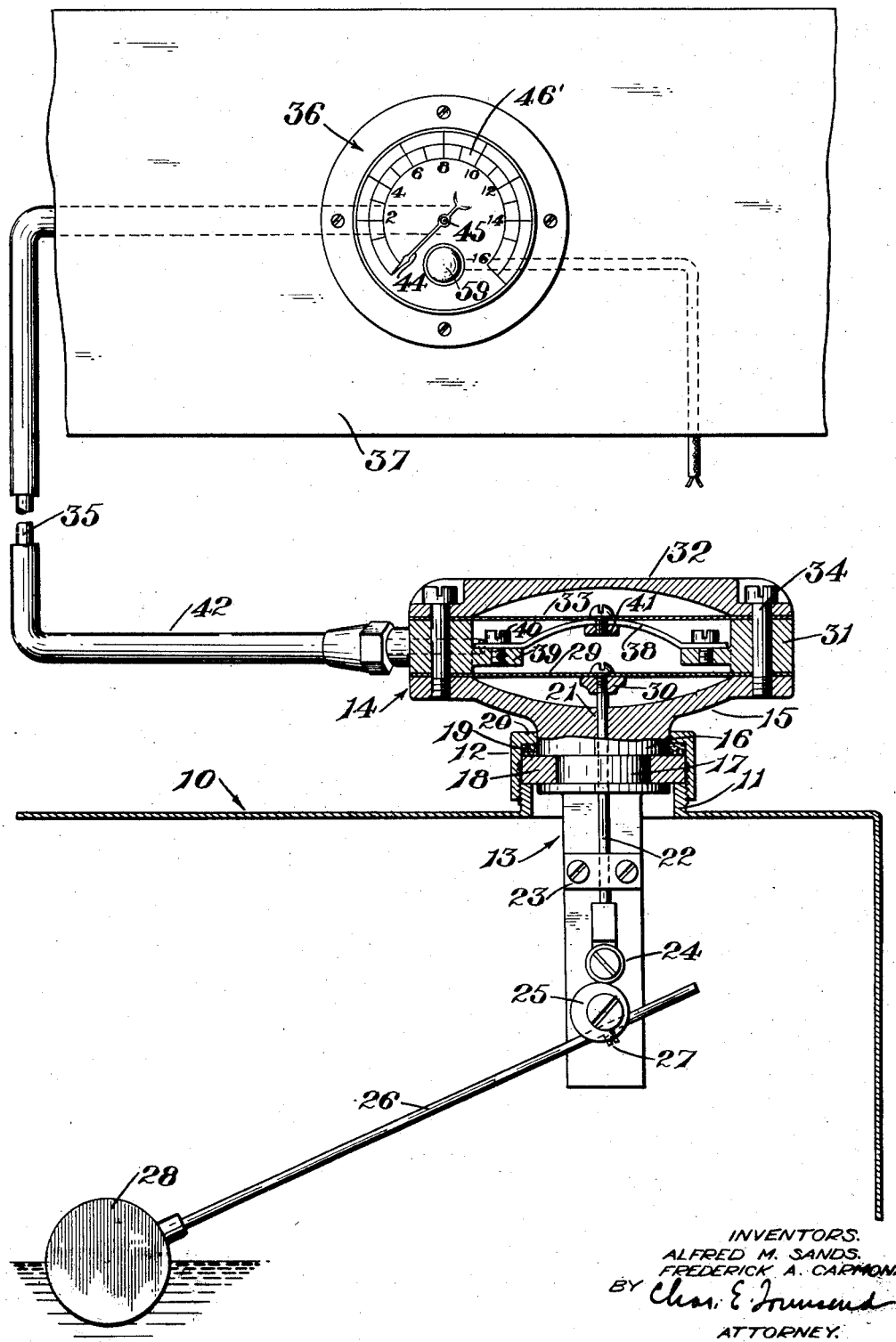
INVENTORS.
ALFRED M. SANDS.
FREDERICK A. CARMONA.
BY Chas. E. Townsend
ATTORNEY.

Patented Sept. 8, 1925.

1,552,762

UNITED STATES PATENT OFFICE.

ALFRED M. SANDS, OF BERKELEY, AND FREDERICK A. CARMONA, OF BURLINGAME, CALIFORNIA, ASSIGNORS TO CARMONA-SANDS CORPORATION, OF SAN FRANCISCO, CALIFORNIA, A CORPORATION OF CALIFORNIA.

LIQUID-MEASURING DEVICE.

Application filed March 16, 1921. Serial No. 452,679.

*To all whom it may concern:*

Be it known that we, ALFRED M. SANDS and FREDERICK A. CARMONA, citizens of the United States, residing at Berkeley, in the county of Alameda, and Burlingame, in the county of San Mateo, respectively, and State of California, have invented new and useful Improvements in Liquid-Measuring Devices, of which the following is a specification.

This invention relates to an indicating device, and particularly pertains to means for measuring volumes of liquid.

It is the principal object of the present invention to provide means whereby the contents of a liquid container may be indicated at a remote point and exterior of the container, said device being particularly applicable for use in connection with fuel tanks of automobiles, where it is desirable to measure the amount of liquid fuel in the tank and to show this measured amount upon an indicator in view of the driver of the automobile, said apparatus being capable of automatically adapting itself to changes in temperature at the indicator and the measuring device.

The present invention contemplates the use of a float member adapted to rest upon the surface of a body of liquid to be measured, and to impart pressure to an incompressible fluid by means of which an indicator will be operated, said indicator being calibrated to show the volumes of liquid within the container and both the measuring device and the indicator being constructed to correct inaccuracies which might be brought about by variations in temperatures.

The invention is illustrated by way of example in the accompanying drawings, in which:

The accompanying drawing illustrates in fragmentary section and elevation one embodiment of the measuring device and the indicating mechanism connected therewith.

Referring more particularly to the drawings, 10 indicates a liquid reservoir. This reservoir is formed with a cylindrical mouth piece 11, which is preferably exteriorly threaded to receive a screw cap 12. Extending through this mouth is the shank 13 of a measuring apparatus 14. The shank 13 is formed integral with a lower dome member 15 and extends from the center thereof. A cylindrical boss 16 is formed as a part of this dome member and to it the shank is directly formed. This boss has an annular groove 17 receiving a split washer 18. The washer is adapted to rest upon the upper face of the mouth member 11 and is held in position by a packing gasket 19 which is clamped down by an inturned flange 20 of the screw cap 12. A central opening 21 is formed through the dome member and the boss to receive a diaphragm stem 22. The lower end of this stem passes through a guide 23 and is equipped with a roller 24. This roller is acted upon by an eccentric 25 which is pivotally mounted on the shank 13 and with its longitudinal axis extending at right angles to the longitudinal axis of the stem 22.

A float lever 26 is adjustably secured to the eccentric by a set screw 27, while the free end of the float lever is fitted with a float 28. This float is, of course, intended to rest upon the surface of the liquid, and has sufficient buoyancy to swing the lever 26, thereby rotating the eccentric 25, and thus reciprocating the diaphragm stem 22.

Secured across the face of the dome member 15 is a metal diaphragm 29. This diaphragm may be made out of a single circular piece of metal, or may be made from two thin metal sheets. In any event the diaphragm stem 22 is secured to the center thereof, and is locked by a nut 30. A filler ring 31 cooperates with the marginal portion of the dome 15 to hold the edge of the diaphragm 29 in position. This filler ring also cooperates with an upper dome member 32 to secure an expansion diaphragm 33 in position between the ring and the dome member, suitable screws 34 being provided to clamp the filler ring and both dome members together.

The diaphragm 29 is adapted to impart motion to an incompressible fluid which fills the space between the pressure diaphragm 29 and the expansion diaphragm 33, and also fills a transmission tube 35 leading to an indicating device 36. This indicator is preferably mounted upon a dashboard 37, and will be more fully described hereinafter.

Due to the fact that local changes in temperature will affect the fluid and also the parts of the measuring device, the expansion diaphragm has been provided to compensate for changes caused by temperature variations. This diaphragm is normally held against expansion by an arcuate thermostat bar 38, which is secured to radial lugs 39 extending inwardly from the filler ring 31. The ends of this bar are fastened to the lugs by screws 40, while the center of the bar is fastened to the center of the diaphragm 33 by a bolt 41. It will thus be evident that expansion of the bar 38 will take place in a direction toward the expansion diaphragm 33 and will thus increase the effective area of the chamber, defined by the circumscribing filler ring 31 and the pressure and expansion diaphragms 29 and 33. This will automatically compensate for heat expansion of the diaphragms, as well as expansion of the incompressible fluid.

Attention is directed to the fact that the incompressible fluid is protected from the heat, while within the transmission tube, by an outer jacket 42, through which the transmission tube 35 extends, and which jacket is of sufficient diameter to form an air chamber completely around the transmission tube and within the jacket, thus acting to insulate the transmission tube from the surrounding atmosphere.

The indicating device 36 may be of any suitable character, but as shown, includes a circular casing which is secured to the dashboard of the car, and which incloses means for operating an indicating hand 44. This hand is mounted upon a central spindle 45, and is adapted to swing over the face of a dial 46'. The dial may be of any preferred design, and is calibrated with reference to the measuring mechanism in a manner to translate the movement of the float 28 into readings indicating the relative quantities of liquid within the reservoir 10.

In operation of the present invention, the float 28 will rest upon the body of liquid within the reservoir. The position of the float will determine the pressure exerted upon the diaphragm 29. This pressure will be imparted to the fluid, and will act through the pipe 35 to actuate the indicator to thereby swing the hand 44. Thus the hand 44 will travel back and forth across the dial and will point to the various numerals on the dial to indicate the number of gallons of liquid within the reservoir.

While we have shown the preferred form of our invention, as now known to us, it will be understood that various changes might be made in the combination, construction and arrangement of parts, by those skilled in the art, without departing from the spirit of the invention, as claimed.

Having thus described our invention, what we claim and desire to secure by Letters Patent is:

1. A measuring device for liquids comprising a tank containing a liquid to be measured, a pressure chamber including a diaphragm, an indicator remote from the tank and pressure chamber, a tubular communicating connection between the pressure chamber and the indicator and containing an incompressible fluid acted upon by said diaphragm to actuate the indicator, a float resting upon the liquid in the tank, means between the float and diaphragm to actuate the latter in accordance with the change in level of the liquid in the tank and means connected to the pressure chamber and independent of said diaphragm to compensate for the expansion of the fluid due to temperature variations in the atmosphere surrounding the apparatus.

2. In a measuring device, a tank containing a fluid to be measured, a casing mounted on the tank, spaced diaphragms mounted in the casing and with a wall of the casing forming a pressure chamber, an indicator remote from the tank, means establishing a communication between the pressure chamber and the indicator and containing an incompressible fluid adapted to be acted upon by actuation of one of said diaphragms, a float resting upon the liquid in the tank, means between the float and the last mentioned diaphragm to actuate the latter in accordance with the change in level of the liquid in the tank, and means having connection with the other of said diaphragms and with said casing for automatically compensating for the expansion of the fluid due to temperature variations in the atmosphere surrounding the apparatus.

3. A measuring device for liquids comprising a tank containing a liquid to be measured, a casing mounted on the tank, spaced upper and lower diaphragms mounted in the casing and with a wall of the casing forming a pressure chamber, said wall of the pressure chamber having inwardly directed lugs, an indicator remote from the tank, a tubular communicating connection between the pressure chamber and the indicator and containing an incompressible fluid acted upon by actuation of the lowermost of said diaphragms, a float resting upon the liquid in the tank, means between the float and the lowermost diaphragm to actuate the latter in accordance with the change level of the liquid in the tank, and means having connection with said lugs and with the uppermost diaphragm to automatically compensate for the expansion of the fluid due to temperature variations in the atmosphere surrounding the apparatus.

4. A measuring device for liquids comprising a tank containing a liquid to be measured, a casing mounted on the tank, upper and lower spaced diaphragms mounted in the casing, and with a wall of the casing forming a pressure chamber, an indicator remote from the tank, a tubular communicating connection between the pressure chamber and the indicator and containing an incompressible fluid acted upon by actuation of the lowermost of said diaphragms, a float resting upon the liquid in the tank, means between the float and the lowermost diaphragm to actuate the latter in accordance with change in the level of the liquid in the tank, and means located between said diaphragms and connected to the upper diaphragm and to a wall of the casing to automatically compensate for the expansion of the fluid due to temperature variations in the atmosphere surrounding the apparatus.

5. A measuring device for liquids comprising a tank containing a liquid to be measured, a casing mounted on the tank, upper and lower spaced diaphragms mounted in the casing, and with a wall of the casing forming a pressure chamber, an indicator remote from the tank, a tubular communicating connection between the pressure chamber and the indicator and containing an incompressible fluid acted against by actuation of the lowermost of said diaphragms, a float resting upon the liquid in the tank, means between the float and the lowermost diaphragm to actuate the latter in accordance with the change in level of the liquid in the tank, and a thermostatic element arranged between the diaphragms and connected to the uppermost diaphragm and to the casing for automatically operating said diaphragm to compensate for the expansion of the fluid due to temperature variations in the atmosphere surrounding the apparatus.

6. In a measuring device, a tank containing a fluid to be measured, a float in the tank, an arm having connection with the float, means forming a pressure chamber including a wall and spaced diaphragms connected to said wall, said chamber containing an incompressible fluid, an indicator, a communicating connection between the pressure chamber and the indicator, a yieldable device having connection with said wall and with one of said diaphragms and adapted to operate the latter to compensate for the expansion of the fluid due to varying temperatures, a stem associated with the aforesaid arm and adapted to be reciprocated thereby and having connection with the other of said diaphragms to increase or decrease the pressure upon the fluid whereby the pressure exerted by the pressure diaphragm against the fluid will be transmitted to the indicator.

ALFRED M. SANDS.
FREDERICK A. CARMONA.